May 5, 1953     A. C. HEEHLER ET AL     2,637,840
POSITION ADJUSTMENT LOCKING DEVICE FOR WARNING LIGHTS
Filed May 14, 1951     2 SHEETS—SHEET 1
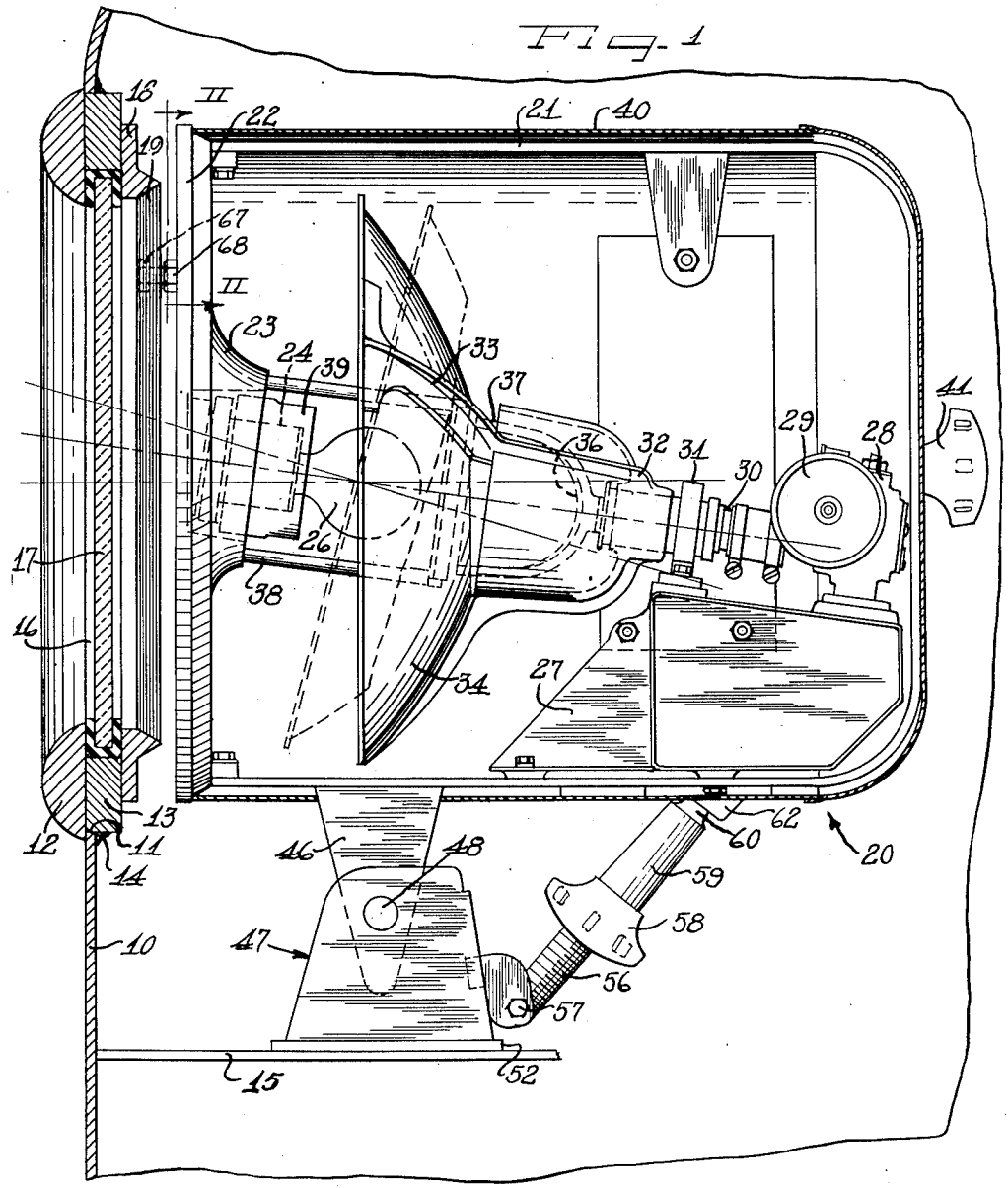
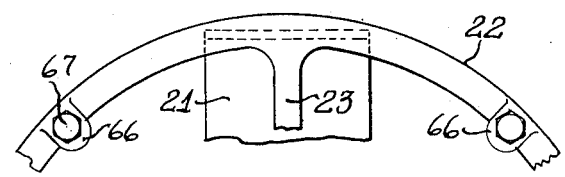
Inventors
Arthur C. Heehler
Thomas E. McDowell

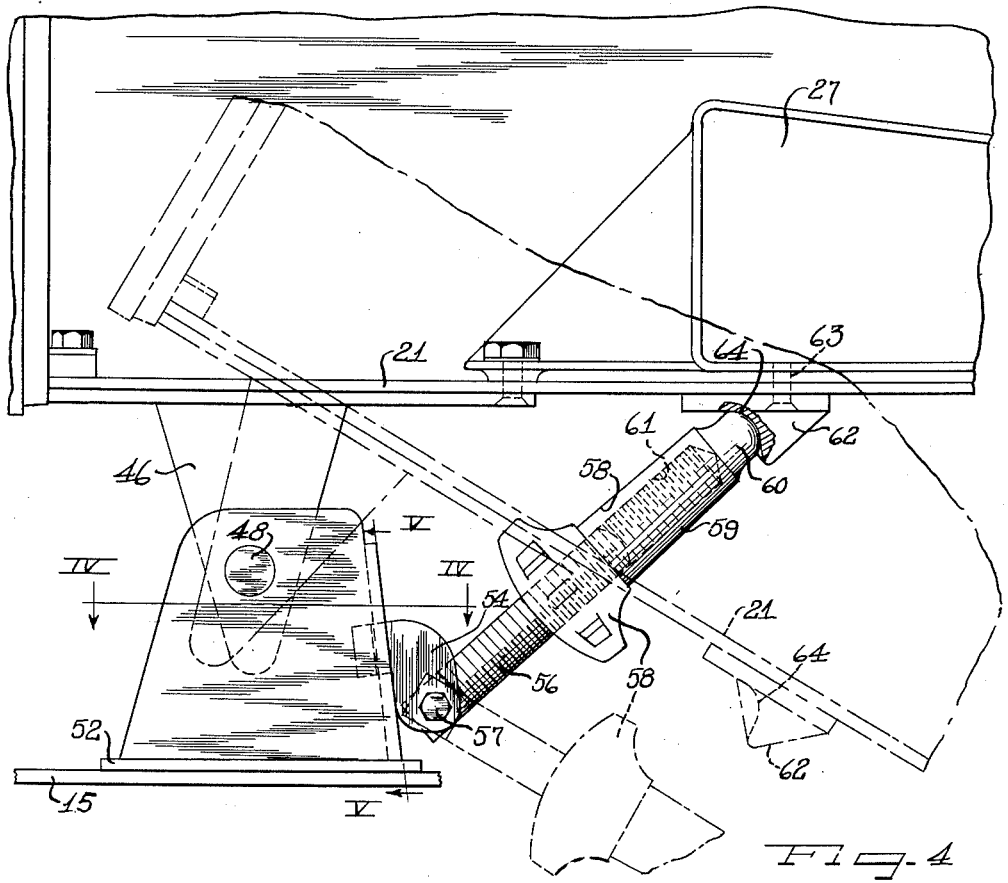
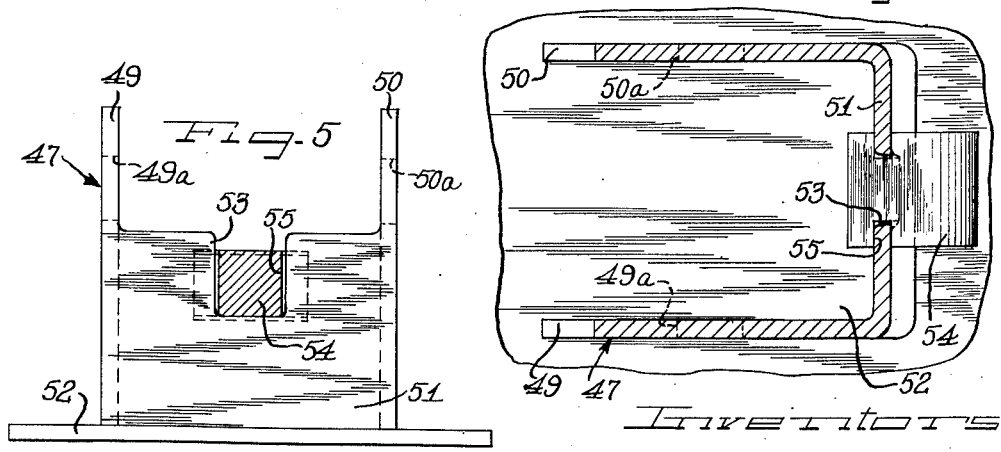
Inventors
Arthur C. Heehler
Thomas E. McDowell

Patented May 5, 1953

2,637,840

UNITED STATES PATENT OFFICE 2,637,840

POSITION ADJUSTMENT LOCKING DEVICE FOR WARNING LIGHTS

Arthur C. Heehler, Chicago, and Thomas E. McDowell, Oak Park, Ill., assignors to The Pyle-National Company, Chicago, Ill., a corporation of New Jersey Application May 14, 1951, Serial No. 226,142

14 Claims. (Cl. 340—49)

This invention relates generally to illumination apparatus and more particularly to a position adjustment locking device wherein the beam of light projected by a warning light apparatus may be selectively positioned in a horizontal alignment relative to a mounting structure and wherein the warning light structure may be locked in firm assembly to retain selected positions of beam alignment.

Although the principles of the present invention are of general utility, a particularly useful application is found in connection with warning lights incorporated on railway vehicles, for example, a warning headlight of the type used on high speed diesel locomotives.

Since warning lights heretofore provided have been developed and manufactured as separate items of manufacture for installation on many different kinds of mounting structures, a particular problem has been presented in connection with the proper mounting of a warning light apparatus. The initial installation must frequently be made in the face of various structural environments, thereby requiring a separate mounting arrangment for each particular installation to insure proper alignment of the beam of light projected by the warning light apparatus.

Furthermore, servicing procedures frequently require that the warning light apparatus be removed, or partially disassembled, for example, if relamping, or some other routine servicing operation is to be carried out. Each time the warning light apparatus is moved, or disassembled, realignment must occur in order to insure proper and efficient operation of the warning light apparatus.

In accordance with the principles of the present invention, a mounting arrangement for a warning light apparatus is provided wherein a support, such as a locomotive shrouding, is provided with a lens covered opening surrounded by a front ring and having a horizontal platform portion extending rearwardly therefrom. A warning light apparatus is also provided to project a beam of light through the lens covered opening. The warning light apparatus is preferably mounted for pivotal movement on the horizontal platform portion by means of a pivot bracket. A biasing means is located between the platform portion and the warning light to pivotally displace the warning light apparatus around the pivot axis of the bracket. An adjustable stop device is carried by the warning light apparatus and is engageable with the front ring to adjustably determine the stop position so that the biasing means, together with the stop device and the pivot bracket operate to retain the warning light in aligned assembly relative to the supporting structure on the locomotive.

The mounting arrangement thus provided not only facilitates the ready installation of a warning light apparatus in connection with the initial mounting procedures, but greatly facilitates servicing operations since the biasing means provided may be quickly and conveniently disconnected to permit pivotal displacement of the warning light apparatus into a fully accessible servicing position. Realignment is accomplished without disturbing any of the previous adjustments effected by the stop device carried on the warning light structure.

It is an object of the present invention, therefore, to provide a mounting arrangement for a warning light apparatus which overcomes the deficiencies of the mounting arrangements heretofore provided.

Another object of the present invention is to provide a mounting arrangement for a warning light apparatus wherein beam alignment may be selectively adjusted and firmly retained.

Yet another object of the present invention is to provide a mounting arrangement which will facilitate servicing operations of a warning light apparatus.

Many other features, advantages and additional objects of the present invention will become manifest to those versed in the art upon making reference to the detailed description which follows and the accompanying sheets of drawings in which a preferred structural embodiment incorporating the principles of the present invention is shown by way of illustrative example.

On the drawings:

Figure 1 is a fragmentary cross-sectional view with parts shown in elevation and with parts broken away for the sake of clarity showing a warning light apparatus assembled on a mounting structure and including the position locking device provided in accordance with the principles of the present invention;

Figure 2 is a reduced cross-sectional view with parts shown in elevation and with parts broken away taken substantially on line II—II of Figure 1;

Figure 3 is a fragmentary side elevational view with parts broken away for the sake of clarity and showing in dotted outline the adjustable positioning features provided in accordance with the principles of the present invention;

Figure 4 is a fragmentary enlarged cross-sectional view taken substantially on line IV—IV of Figure 3; and Figure 5 is a fragmentary cross-sectional view with parts shown in elevation taken substantially on line V—V of Figure 3.

As shown on the drawings:

The principles of the present invention find a particularly useful application when employed in connection with a warning light apparatus adapted to project a beam of light in aligned relationship relative to a mounting structure and in the present disclosure are described by way of illustrative example in combination with a warning light apparatus similar to that employed on movable vehicle such as a railway locomotive.

In Figure 1 is shown a mounting structure having portions lying on different planes aligned normally with respect to one another. For purposes of illustration, the mounting structure takes the form of a front support 10 comprising the shrouding of a locomotive, or the like having an opening 11 formed therein surrounded by a bezel ring 12 on the outside face of the support 10. A mounting ring 13 is welded in the opening 11 as at 14 and centers and supports an annular rubber gasket 16 which is U-shaped in cross section to receive a lens 17. A clamping ring 18 having an annular upstanding rib 19 is connected to the mounting ring 13 and abuts up against the gasket 16 to retain the lens 17 firmly in place in the front support 10.

Extending rearwardly from the front support 10 is a horizontally disposed plate 15 comprising a horizontal support perpendicularly aligned relative to the front support and adapted to mount a warning light apparatus indicated generally by the reference numeral 20.

The warning light apparatus 20 includes a U-shaped frame 21 secured to a front ring 22 having a diametrically extending front support 23 mounting a socket 24 which, in turn, receives an incandescent bulb 26, thereby providing a light source for the warning light apparatus 20.

A mounting shoe 27 is carried by the U-shaped frame 21 and supports a prime mover such as an electrical motor 28 connected in driving relation through a gear box 29 to a power delivery shaft mechanism indicated generally at 30 journaled for rotation in a bearing means 31 carried by the shoe 27.

The power delivery shaft mechanism 30 rotatably drives a spider 32 having a plurality of radially extending arms 33 which are arranged to support a parabolic reflector 34 in eccentrically offset relationship relative to the axis of rotation of the power delivery shaft mechanism 30.

The reflector 34 is carried in spaced relationship to the bulb 26 and is arranged to be gyrated upon rotation of the spider 32 to reflect the light of emission from the bulb 26 outwardly through the front ring 22 in a movable pattern.

In order to selectively color the beam of light projected by the warning light apparatus 20, a color filter mechanism may be interposed between the light bulb 26 and the reflector 34, the particular mechanism herein employed including a cup-shaped color filter 36 supported in a color filter holder 37 and arranged to be selectively reciprocated along a pair of guide rods 38 and through a central aperture formed in the reflector 34.

The color filter support 37 is connected to suitable actuated means provided in the power delivery shaft mechanism 30 which are responsive to the direction of rotation of the motor 28 so as to selectively reciprocate the color filter 36 from an inactive position in back of the reflector 34 to a screening position between the bulb 26 and the reflector 34. In order to insure that no stray rays of natural light interfere with the projection of a colored beam of light, a shield 39 is provided around the socket 24 to cooperate with the color filter 36.

Surrounding the entire warning light apparatus 20 is a casing 40 which abuts the front ring 22 and is retained in firm assembly by means of a handwheel 41 threaded onto a suitable projecting stud carried by the U-shaped frame 21.

A mounting foot 46 is connected to a lower portion of the U-shaped frame 21 and pivotally supports the warning light apparatus 20 on a bracket 47 by means of a pivot pin 48, the bracket 47 having a pair of spaced legs 49 and 50 joined by a body portion 51 and arranged to receive the pivot pin 48. In this connection, the leg 49 is provided with an aperture 49a and the leg 50 is provided with an aperture 50a, which apertures are coaxially aligned to receive the pivot pin 48.

The bracket 47 is further provided with a pad 52 which is firmly connected to the horizontal support 15.

The body member 51 of the bracket 47 is provided with an open ended slot 53 to receive in inserted assembly a swivel yoke 54 recessed as at 55, thereby to lock behind the body member 51.

A threaded stud 56 is pivotally pinned to the swivel yoke 54 by means of a bolt 57 constituting a pivot pin.

The threaded stud 56 is telescopically related to a swivel screw handwheel 58 having an axially extending tubular portion 59 terminating in a swivel nipple 60. It will be understood that a threaded bore 61 extends through the handwheel 58 and the axially extending tubular portion so that relative telescopic adjustment of the threaded stud 56 and the swivel screw handwheel will effect length adjustments.

A swivel socket 62 is firmly connected to the U-shaped frame 21 by means of suitable fasteners 63 and is provided with a recess 64 to seat the nipple 60.

Referring particularly to Figures 1 and 2, it will be noted that the front ring 22 is provided with a pair of spaced bosses 66, each having an appropriately threaded aperture to receive a stop 67 comprising a threaded cap screw, or the like. The stop 67 may be selectively axially advanced in each of the bosses 66 and adjusted positions thereof may be locked by means of a lock nut 68. The stops 67 are arranged to come in registry with the clamping ring 18 so as to engagingly abut the clamping ring 18 when the warning light apparatus 20 is pivotally displaced around the pivot pin 48 toward the front support 10.

In this connection, the threaded stud 56 and the swivel screw handwheel 58 may be conveniently employed as a biasing means to apply a displacing force to the warning light apparatus 20 at a point spaced longitudinally relative to the pivot pin 48, thereby to exert a turning torque on the warning light apparatus 20.

By selectively adjusting the position of the stops 67 to selectively vary the stop position of the warning light apparatus 20 relative to the front support 10, the biasing means comprising the threaded stud 56 and the swivel screw handwheel 58, together with the bracket 47 and the stops 67 operate to retain the warning light apparatus 20 in aligned assembly relative to the horizontal support 15 and the front support 10.

As shown in Figure 3, if it is necessary to gain access to the warning light apparatus 20, the swivel screw handwheel 58 may be backed off to release the nipple from the recess 64 whereupon the stud 56 will pivotally hinge on the bolt 57 and the warning light apparatus 20 will pivotally hinge around the axis of the pivot pin 48. To realign the warning light apparatus 20, the entire mechanism is merely restored to its original position and the swivel screw handwheel 58 is again turned up tightly to wedge the warning light mechanism 20 into locked position.

Although various minor structural modifications might be suggested by those versed in the art, it should be understood that we wish to embody within the scope of this patent all such modifications as reasonably and properly come within the scope of our contribution to the art.

We claim as our invention:

1. A warning light apparatus comprising a stationary front ring, a stationary platform extending away from said front ring, a warning light casing pivotally mounted on said platform, and a wedge lock between said warning light casing and said platform to pivotally force said warning light casing into engaging abutment with said front ring.

2. A warning light apparatus comprising a support structure having support elements on relatively aligned planes to form a stationary vertical support and a stationary horizontal support, a warning light to be supported and having a longitudinal axis adapted to be adjustably aligned relative to said horizontal support, a pivotal connection between said horizontal support and said warning light, and biasing means between said warning light and said horizontal support, said biasing means engageable with said warning light at a point spaced longitudinally from said pivotal connection to pivotally displace said warning light about said pivotal connection, said warning light having stop means on the front thereof to abuttingly engage said vertical support, said biasing means, together with said pivotal connection and said stop means retaining said warning light in predetermined aligned assembly with said support structure.

3. A warning light apparatus comprising a support structure having support elements on relatively aligned planes to form a stationary vertical support and a stationary horizontal support, a warning light to be supported and having a longitudinal axis adjustably aligned relative to said horizontal support, a pivotal connection between said horizontal support and said warning light, and biasing means between said warning light and said horizontal support, said biasing means engaging said warning light at a point spaced longitudinally from said pivotal connection to pivotally displace said warning light about said pivotal connection, said warning light having stop means on the front thereof to abuttingly engage said vertical support, said biasing means, together with said pivotal connection and said stop means retaining said warning light in predetermined aligned assembly with said support structure, said stop means including adjustable elements to selectively vary the stop position at which engaging abutment is obtained, thereby to selectively adjust the alignment of said warning light relative to said support, said biasing means structure having length adjusting means to accommodate variations in stop position.

4. A warning light apparatus comprising a support structure having support elements on relatively aligned planes to form a stationary vertical support and a stationary horizontal support, a warning light to be supported and having a longitudinal axis adapted to be adjustably aligned relative to said horizontal support, a pivotal connection between said horizontal support and said warning light, and biasing means between said warning light and said horizontal support, said biasing means engaging said warning light at a point spaced longitudinally from said pivotal connection to pivotally displace said warning light about said pivotal connection, said warning light having stop means on the front thereof to abuttingly engage said vertical support, said biasing means, together with said pivotal connection and said stop means retaining said warning light in predetermined aligned assembly with said support structure, said stop means including adjustable elements to selectively vary the stop position at which engaging abutment is obtained, thereby to selectively adjust the alignment of said warning light relative to said support structure, said biasing means comprising a threaded stud and a sleeve threaded thereon, said stud and said sleeve being axially adjustable to selectively vary the effective length thereof, said stud and said sleeve being adjustably extendible between said warning light and said horizontal support.

5. A warning light apparatus comprising a stationary support structure having support elements on relatively aligned planes to form a vertical support and a horizontal support, a warning light to be adjustably supported and having a longitudinal axis adapted to be aligned relative to said horizontal support, a pivotal connection between said horizontal support and said warning light, and biasing means between said warning light and said horizontal support, said biasing means engageable with said warning light at a point spaced longitudinally from said pivotal connection to pivotally displace said warning light about said pivotal connection, said warning light having stop means on the front thereof to abuttingly engage said vertical support, said biasing means, together with said pivotal connection and said stop means retaining said warning light in predetermined aligned assembly with said support structure, said stop means including adjustable elements to selectively vary the stop position at which engaging abutment is obtained, thereby to selectively adjust the alignment of said warning light relative to said support structure, said biasing means comprising a pair of axially adjustable telescoping members having means to retain same in adjusted axial positions, one of said members being pivotally connected between said warning light and said horizontal support, the other of said members being adjustably extendible between said warning light and said horizontal support.

6. A warning light apparatus comprising a support structure having stationary support elements on relatively aligned planes to form a vertical support and a horizontal support, a warning light to be supported and having a longitudinal axis aligned relative to said horizontal support, a pivotal connection between said horizontal support and said warning light, and biasing means between said warning light and said horizontal support, said biasing means engageable with said warning light at a point longitudinally spaced from said pivotal connection to pivotally displace said warning light about said pivotal connection, said warning light having stop means on the front thereof to abuttingly engage said vertical support, said biasing means, together with said pivotal connection and said stop means retaining said warning light in predetermined aligned assembly with said support structure, said stop means including adjustable elements to selectively vary the stop position at which engaging abutment is obtained, thereby to selectively adjust the alignment of said warning light relative to said support structure, said biasing means comprising a pair of axially adjusable telescoping members having means to retain same in axially adjusted positions, one of said members being pivotally connected to said horizontal support, the other of said members being engageable with said warning light.

7. A mounting arrangement for a warning light comprising a support having a stationary ring and a stationary horizontal platform extending rearwardly therefrom, a warning light to project a beam of light through said front ring, a pivot bracket to pivotally mount said warning light on said horizontal platform, a biasing means between said platform and said warning light to pivotally displace said warning light around said bracket and a stop on said warning light engaging said front ring, said biasing means, together with said stop and said bracket retaining said warning light in aligned assembly with said support.

8. A mounting arrangement for a warning light comprising a stationary support having a front ring and a horizontal platform extending rearwardly therefrom, a warning light to project a beam of light through said front ring, a pivot bracket to pivotally mount said warning light on said horizontal platform, a biasing means between said platform and said warning light to pivotally displace said warning light around said bracket and a stop on said warning light engaging said front ring, said biasing means, together with said stop and said bracket retaining said warning light in aligned assembly with said support, said stop being adjustable to selectively vary the stop position between said front ring and said warning light for adjusting the beam alignment of said warning light relative to said front ring.

9. A mounting arrangement for a warning light comprising a stationary lens support having a lens therein, a stationary warning light support disposed in angular relation to said lens support, a warning light adapted to project a beam of light through said lens, a pivot bracket pivotally connecting said warning light to said warning light support, means to selectively pivotally displace said warning light around said bracket toward said lens support, and an adjustable stop carried by said warning light and engaging said lens support to vary the alignment of said beam of light through said lens.

10. A mounting arrangement for a warning light comprising a stationary lens support having a lens therein, a stationary warning light support disposed in angular relation to said lens support, a warning light adapted to project a beam of light through said lens, a pivot bracket pivotally connecting said warning light to said warning light support, means to selectively pivotally displace said warning light around said bracket toward said lens support, and an adjustable stop carried by said warning light and engageable with said lens support to vary the alignment of said beam of light through said lens, said means to pivotally displace said warning light comprising an adjustable wedge device between said stationary warning light support and said warning light, said wedge device, together with said stop and said bracket operable to lock said warning light in aligned assembly relative to said lens support.

11. A position adjustment apparatus for mounting a warning light apparatus in a locomotive or the like, comprising a stationary support structure having support elements arranged on angularly aligned planes, a frame, light source means carried by said frame to project a beam of light intersecting the plane of one of said support elements, a pivot bracket pivotally mounting said frame on the other of said support elements, a threaded stud pivotally connected to said bracket, a sleeve threadedly adjustable on said stud and having a swivel nipple on the end thereof, a swivel socket on said frame spaced from said bracket and arranged to seat said swivel nipple, said sleeve being axially adjustable on said stud to pivot said frame toward said one of said support elements, and an adjustable stop device carried on said frame and arranged to abuttingly engage said one of said support elements, said stop device being selectively adjustable to vary the alignment of the beam of light relative to the plane of said one support element, said stud, together with said sleeve, said bracket and said stop device operable to lock said frame in aligned assembly relative to said support structure.

12. A warning light apparatus comprising a support structure having support elements on relatively aligned planes to form a stationary vertical support and a stationary horizontal support, a warning light to be supported and having a longitudinal axis adjustably aligned relative to said horizontal support, a pivotal connection between said horizontal support and said warning light, and biasing means between said warning light and said horizontal support, said biasing means engaging said warning light at a point spaced longitudinally from said pivotal connection to pivotally displace said warning light about said pivotal connection, and stop means cooperating between said warning light and said vertical support and including adjustable elements to selectively vary the stop position of said warning light for selectively adjusting the alignment of said warning light relative to said support structure.

13. A warning light adjustment apparatus for use with a stationary support structure having support elements arranged on different planes, comprising, a frame, a pivot bracket adapted to pivotally support said frame on one of the stationary support elements, a biasing means between said pivot bracket and said frame to pivotally displace the frame on said bracket, and an adjustable stop device carried on said frame and arranged to abuttingly engage the other of the stationary support elements, thereby to lock said frame in alignment assembly with the stationary support structure.

14. A warning light adjustment apparatus as defined in claim 13, said biasing means comprising a threaded stud pivotally connected to said bracket, a sleeve threadedly adjustable on said stud and having a swivel nipple on the end thereof, and a swivel socket on said frame spaced from said bracket and arranged to seat said swivel nipple.

ARTHUR C. HEEHLER.
    THOMAS E. McDOWELL.

References Cited in the file of this patent

UNITED STATES PATENTS

| Number | Name | Date |
|---|---|---|
| 2,446,333 | Kennelly | Aug. 3, 1948 |
| 2,464,318 | Kennelly | Mar. 15, 1948 |
| 2,486,853 | Kennelly | Mar. 1, 1949 |
| 2,510,892 | Kennelly | June 6, 1950 |